United States Patent
Horikawa et al.

(10) Patent No.: US 12,074,328 B2
(45) Date of Patent: Aug. 27, 2024

(54) NON-AQUEOUS ELECTROLYTE SECONDARY BATTERY

(71) Applicant: Prime Planet Energy & Solutions, Inc., Tokyo (JP)

(72) Inventors: Daisuke Horikawa, Kariya (JP); Yohei Shindo, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 301 days.

(21) Appl. No.: 17/557,079

(22) Filed: Dec. 21, 2021

(65) Prior Publication Data

US 2022/0209242 A1 Jun. 30, 2022

(30) Foreign Application Priority Data

Dec. 24, 2020 (JP) ................... 2020-215016

(51) Int. Cl.
*H01M 4/66* (2006.01)
*H01M 4/131* (2010.01)
(Continued)

(52) U.S. Cl.
CPC .......... *H01M 4/661* (2013.01); *H01M 4/131* (2013.01); *H01M 4/666* (2013.01); *H01M 4/667* (2013.01);
(Continued)

(58) Field of Classification Search
CPC ...... H01M 4/661; H01M 4/131; H01M 4/666; H01M 10/0525; H01M 10/0585;
(Continued)

(56) References Cited

U.S. PATENT DOCUMENTS

2004/0081889 A1 4/2004 Lee et al.
2011/0039161 A1* 2/2011 Torata ................ H01M 50/414
429/247
(Continued)

FOREIGN PATENT DOCUMENTS

CN 1492529 A 4/2004
JP H11-102711 A 4/1999
(Continued)

OTHER PUBLICATIONS

Machine Translation of JP-2020126803-A. 11/13 (Year: 2023).*

*Primary Examiner* — Pamela H Weiss
*Assistant Examiner* — Kevin Nguyen
(74) *Attorney, Agent, or Firm* — HAUPTMAN HAM, LLP

(57) ABSTRACT

A non-aqueous electrolyte secondary battery disclosed herein includes a positive electrode, a negative electrode, and a non-aqueous electrolyte. The positive and negative electrodes each include a current collector and a mixture layer formed on the surface of the current collector. The current collector includes a resin layer and metallic foils provided on both surfaces of the resin layer in at least one of the positive and negative electrodes. A surface of the metallic foils on which the mixture layer is formed is roughened. Furthermore, the average X (μm) of the thicknesses at the thinnest parts and the average Y (μm) of the thicknesses at the thickest parts of the metallic foil determined based on a plurality of obtained sectional SEM images in a stacked direction of the resin layer and the metallic foils satisfy the following relationship: $0.1\ \mu m < X < 4\ \mu m$, and $1.2 \leq Y/X$.

7 Claims, 2 Drawing Sheets

(51) Int. Cl.
    *H01M 10/0525* (2010.01)
    *H01M 10/0585* (2010.01)
(52) U.S. Cl.
    CPC ... *H01M 10/0525* (2013.01); *H01M 10/0585* (2013.01)
(58) Field of Classification Search
    CPC .. H01M 4/667; H01M 4/668; H01M 10/4235; H01M 50/581; Y02E 60/10
    USPC .......................................................... 429/209
    See application file for complete search history.

(56) References Cited

U.S. PATENT DOCUMENTS

| | | | |
|---|---|---|---|
| 2012/0129047 | A1 | 5/2012 | Matsuyama et al. |
| 2017/0040593 | A1* | 2/2017 | Miyagi ............... H01M 50/124 |
| 2018/0105687 | A1 | 4/2018 | Ito et al. |
| 2022/0367879 | A1* | 11/2022 | Horikawa ............... H01M 4/66 |

FOREIGN PATENT DOCUMENTS

| | | | | |
|---|---|---|---|---|
| JP | 200726913 | A | | 2/2007 |
| JP | 2008-123814 | A | | 5/2008 |
| JP | 5939346 | B1 | | 6/2016 |
| JP | 2019-129145 | A | | 8/2019 |
| JP | 2020126803 | A | * | 8/2020 |

\* cited by examiner

NON-AQUEOUS ELECTROLYTE SECONDARY BATTERY

CROSS-REFERENCE TO RELATED APPLICATIONS

This application claims the benefit of foreign priority to Japanese Patent Application No. 2020-215016, filed on Dec. 24, 2020, the entire contents of which are incorporated herein by reference.

BACKGROUND

1. Technical Field

The present disclosure relates to a non-aqueous electrolyte secondary battery. Specifically, the present disclosure relates to a non-aqueous electrolyte secondary battery including a current collector provided with a resin layer between metallic foils.

2. Description of the Background

In recent years, secondary batteries such as lithium ion secondary batteries have been suitably used for portable power sources for personal computers, mobile devices, etc., or vehicle-driving power sources for battery electric vehicles (BEVs), hybrid electric vehicles (HEVs), plug-in hybrid electric vehicles (PHEVs), etc.

An electrode used for secondary batteries is generally provided with metallic foils as current collectors and a mixture layer containing an active material formed on the surface of the metallic foils. An active material expands and contracts by discharging and charging. Thus, a mixture layer containing an active material may peel off metallic foils by repeating discharging and charging. Japanese Patent Application Publication No. 2007-26913 discloses multi-layered laminated metal foils used for electrodes of lithium ion secondary batteries. This laminated metal foils have a constitution in which each metal foil has a roughened surface, and a plurality of the metal foils are laminated such that the roughened surfaces of the metal foils abut on each other. This laminated metal foils enable intervals to be formed between the roughened surfaces abutting on each other, thereby improving the elastic modulus. Due to this feature, the load applied to the metallic foil due to the volume expansion of the active material during charging is relieved, the mixture layer is prevented from peeling off the current collector upon discharging and charging, the entire electrode is prevented from deformation and fracture, and the cycle characteristics can be improved while the energy density is increased.

SUMMARY

By the way, when foreign matters are got into an electrode of a secondary battery, abnormal heating due to internal short-circuit may occur. When the secondary battery is used improperly, such as overcharging, abnormal heating may occur. The fusing temperature of an aluminum foil generally used in a positive electrode is approximately 660° C., and the fusing temperature of a copper foil generally used in a negative electrode is approximately 1100° C. Accordingly, the temperature of a battery may rise to approximately 660° C. in abnormal heating. Thus, a mechanism for interrupting the current at an early stage when abnormal heating occurs in an electrode is desired to be installed.

On the other hand, thinning metal foils in electrodes has been studied to increase the capacities of secondary batteries. However, since the strength of a metallic foil decreases as the metallic foil becomes thinner, a mixture layer tends to peel off a metallic foil due to the expansion and contraction of a mixture layer associated with discharging and charging. This poses a problem relating to lowered cycle characteristics.

The present disclosure has been made in view of the above problem and has an object to provide a non-aqueous electrolyte secondary battery including a mechanism that breaks a metallic foil provided in an electrode at abnormal heating and can achieve excellent cycle characteristics.

The present inventor has been keenly studied for solving the above problem, and as a result, found that excellent cycle characteristics can be achieved and metallic foils can be broken at lower temperatures at abnormal heating by using a current collector having a constitution provided with a resin layer and metallic foils having a surface roughened so as to satisfy a predetermined parameter provided on the surfaces of the resin layer.

That is, a non-aqueous electrolyte secondary battery disclosed herein includes a positive electrode, a negative electrode, and a non-aqueous electrolyte. The positive and negative electrodes each include a current collector and a mixture layer formed on the surface of the current collector. The current collector includes a resin layer and metallic foils provided on both surfaces of the resin layer in at least one of the positive and negative electrodes. A surface of the metallic foils on which the mixture layer is formed is roughened. Furthermore, the average X (μm) of the thicknesses x at the thinnest parts and the average Y (μm) of the thicknesses y at the thickest parts of the metallic foils determined based on a plurality of obtained sectional SEM images in a stacked direction of the resin layer and the metallic foils satisfy the following relationship:

$$0.1 \ \mu m < X < 4 \ \mu m, \text{ and } 1.2 \leq Y/X.$$

According to such a constitution, a resin layer melts at a lower temperature than the fusing temperature of the metallic foils, and the volume of the resin layer increases in the current collector. Thus, the metallic foils can be broken by the pressure applied to the metallic foil due to the volume increase. The electrical resistance rapidly increases by the breaking, and therefore, the current in the battery can be interrupted. Additionally, the metallic foils have thinner portions which can be starting points of breaking. Due to this feature, the metallic foils are easily broken by the volume increase due to the melting of the resin layer when the temperature of the non-aqueous electrolyte secondary battery rises by abnormal heating caused by, for example, internal short-circuits, and the current can be interrupted. Consequently, a non-aqueous electrolyte secondary battery with higher safety can be realized. Furthermore, since the mixture layer does not easily peel off the metallic foil according to the above constitution, excellent cycle characteristics can be achieved.

In a preferred embodiment of the non-aqueous electrolyte secondary battery disclosed herein, the roughened surface is provided over the entire range, in which the mixture layer is formed, of the metallic foils.

According to the above constitution, a higher level of safety and excellent cycle characteristics can be achieved.

In a preferred embodiment of the non-aqueous electrolyte secondary battery disclosed herein, the resin layer is constituted of a thermoplastic resin. In another preferred embodiment, the thermoplastic resin has a melting point of 265° C. or lower under 1 atm. In another preferred embodiment, the thermoplastic resin has a melting point of 200° C. or lower under 1 atm.

According to the above constitution, the thermoplastic resin melts at lower temperatures at abnormal heating and the metallic foils can be broken by the volume increase of the resin layer. Therefore, a non-aqueous electrolyte secondary battery with higher safety can be realized.

In a preferred embodiment of the non-aqueous electrolyte secondary battery disclosed herein, the current collector provided in the negative electrode includes the resin layer and the metallic foils, and the metallic foils are constituted of copper. In another preferred embodiment, the current collector provided in the positive electrode includes the resin layer and the metallic foils, and the metallic foils are constituted of aluminum.

According to the above constitution, the metallic foils can be broken at abnormal heating in at least one of the negative and positive electrodes, and therefore, a non-aqueous electrolyte secondary battery with high safety can be achieved.

In a preferred embodiment of the non-aqueous electrolyte secondary battery disclosed herein, the resin layer includes a conductive particle. In another preferred embodiment, the conductive particle is constituted of the same metal as the metallic foil in contact with the resin layer.

According to the above constitution, the electrical resistance can be more reduced.

In a preferred embodiment of the non-aqueous electrolyte secondary battery disclosed herein, the resin layer includes a filler.

According to the above constitution, particularly cycle characteristics can be improved.

DETAILED DESCRIPTION

Hereinafter, one embodiment of the technique disclosed herein is described in detail with reference to the drawings. Matters other than those specifically mentioned in the present description but necessary for implementation may be recognized as design matters for a person skilled in the art based on conventional techniques in the art. The technique disclosed herein can be implemented based on the content disclosed in the present description and a common general technical knowledge in the art. In the appended drawings, members and sites having the same effect are assigned with the same numerals or symbols, and redundant explanations may be omitted or simplified. The dimensional relationships (lengths, widths, thicknesses, etc.) in each figure do not reflect actual dimensional relationships. The symbol W represents a "width direction", and the symbol T represents a "thickness direction" in each figure. Note that these directions are defined for explanatory convenience and are not intended to limit the mode of installation of the non-aqueous electrolyte secondary battery disclosed herein.

A numeral range represented by "A to B" (where A and B are any numerical values) used in the present description means "not less than A and not more than B", similarly to general interpretations.

In the present description, the term "non-aqueous electrolyte secondary battery" refers to a battery including a non-aqueous electrolyte as a charge carrier and allowing repeated discharging and charging associated with the transfer of charge carriers between positive and negative electrodes in general. The electrolyte in the non-aqueous electrolyte secondary battery may be, for example, any one of non-aqueous electrolyte solutions, gel electrolytes, and solid electrolytes. Such non-aqueous electrolyte secondary batteries encompass batteries generally referred to as lithium ion batteries, lithium secondary batteries, or the like, as well as lithium polymer batteries, lithium ion capacitors, and the like. Hereinafter, an exemplary non-aqueous electrolyte lithium ion secondary battery in which a laminated electrode body is housed in an exterior body made of a laminated film will be explained in detail as an example of the non-aqueous electrolyte secondary battery disclosed herein.

Figure 1:
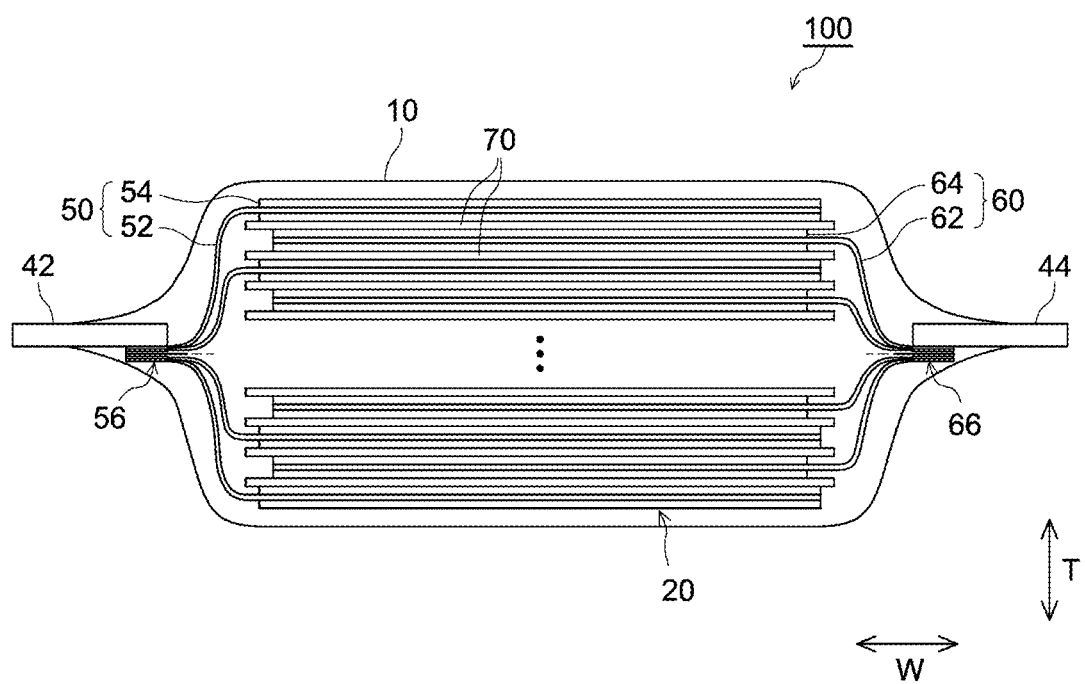
FIG. 1 is a sectional view schematically illustrating a structure of a lithium ion secondary battery according to an embodiment.

FIG. 1 is a sectional view schematically illustrating the structure of a lithium ion secondary battery 100 according to an embodiment. As illustrated in FIG. 1, the lithium ion secondary battery 100 houses an electrode body 20 and a non-aqueous electrolyte (not illustrated) inside an exterior body 10. An end of a positive electrode current collector terminal 42 is electrically connected to a positive electrode 50 in the exterior body 10, and an end of a negative electrode current collector terminal 44 is electrically connected to a negative electrode 60 in the exterior body 10. The other ends of the positive electrode current collector terminal 42 and the negative electrode current collector terminal 44 are exposed to the outside of the exterior body 10.

The exterior body 10 is formed in a bag shape by a laminated film. The exterior body 10 has a housing space for housing the electrode body 20 and the non-aqueous electrolyte solution there inside and can be sealed by thermally welding (heat-sealing) the periphery of the housing space.

The material constituting the laminated film is not particularly limited, and typically a material having a constitution in which a foil-shaped metal and a resin sheet are laminated can be used. For example, a three-layer structure laminated film may be used, which is obtained by providing a metal layer such as aluminum on the surface of a cast polypropylene film (CPP) for thermal welding for the purpose of imparting heat resistance, seal strength, impact resistance, or the like, and further providing an external resin layer consisting of polyethylene terephthalate (PET), polyamide (PA), a nylon film, or the like on the surface of the metal layer.

The electrode body 20 is configured by laminating a plurality of electrode sheets of the positive electrodes 50 and the negative electrodes 60 via separators 70 in an insulated state. The electrode sheets of the positive electrodes 50 and the negative electrodes 60 have wide rectangular surfaces and are laminated such that the wide rectangular surfaces face each other. The stacked direction of the electrode body 20 in this embodiment is the thickness direction T.

The electrode sheet (positive electrode sheet) of the positive electrode 50 includes a sheet-shaped positive electrode current collector 52 having a wide rectangular surface and a positive electrode mixture layer 54 coated on the surface of the positive electrode current collector 52. On the edge of one side in the width direction (W direction in FIG. 1) of the positive electrode current collector 52, a positive electrode current collector exposed part, in which no positive electrode mixture layer 54 is formed, is provided. A positive electrode terminal joint 56 is formed by joining the positive electrode current collector exposed parts of laminated positive electrode sheets in a bundle from the stacked direction (T direction in FIG. 1).

The electrode sheet (negative electrode sheet) of the negative electrode 60 includes a sheet-shaped negative electrode current collector 62 having a wide rectangular surface and a negative electrode mixture layer 64 coated on the surface of the negative electrode current collector 62. On the edge of one side in the width direction (W direction in FIG. 1) of the negative electrode current collector 62, a negative electrode current collector exposed part, in which no negative electrode mixture layer 64 is formed, is provided. A negative electrode terminal joint 66 is formed by joining the negative electrode current collector exposed parts of laminated negative electrode sheets in a bundle from the stacked direction (T direction in FIG. 1).

The positive electrode current collector terminal 42 is a plate-shaped conductive member. The one end thereof is joined to the positive electrode terminal joint 56 inside the exterior body 10, and the other end thereof is exposed to the outside of the exterior body 10. At a portion where the positive electrode current collector terminal 42 penetrates the exterior body 10, two laminated films are superimposed such that the two laminated films sandwich the positive electrode current collector terminal 42 in the thickness direction T, and the laminated film are welded on the surfaces of the positive electrode current collector terminal 42. Alternatively, a welding film made of a resin may be interposed between the positive electrode current collector terminal 42 and a laminated film for improving the welding strength.

The negative electrode current collector terminal 44 may have the same structure as the above positive electrode current collector terminal 42 except that one end thereof is joined to the negative electrode terminal joint 66.

The positive electrode current collector provided in the positive electrode 50 may be aluminum foil, for example. Alternatively, the positive electrode current collector may be a current collector having a constitution disclosed herein. Such a constitution will be described hereinafter.

The positive electrode mixture layer 54 provided in the positive electrode 50 contains a positive electrode active material. Examples of the positive electrode active material include lithium composite metal oxides having, for example, layered structures, spinel structures, or the like (such as $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, $LiFePO_4$, or the like). The positive electrode mixture layer 54 includes a conductive assistant, a dispersing agent, a binder, or the like. As the conductive assistant, for example, carbon materials such as carbon black, including acetylene black (AB), or other carbon materials (such as graphite) may suitably be used. As the dispersing agent, for example, polyvinyl alcohol (PVA) or the like may be used. As the binder, for example, polyvinylidene fluoride (PVDF) or the like may be used.

The positive electrode mixture layer 54 may be formed by dispersing a positive electrode active material and an optional material (a conductive material, a binder, or the like) in a suitable solvent (for example, N-methyl-2-pyrrolidone: NMP), preparing a paste (or slurry) composition, coating a suitable amount of the composition on the surface of the positive electrode current collector 52, and drying the composition.

The negative electrode current collector provided in the negative electrode 60 may be, for example, a copper foil. Alternatively, the negative electrode current collector may be a current collector having a constitution disclosed herein. Such a constitution will be described hereinafter.

The negative electrode mixture layer 64 provided in the negative electrode 60 contains a negative electrode active material. For example, carbon materials such as graphite, hard carbon, or soft carbon, or silicon materials including Si, SiO, or the like. In addition, the negative electrode mixture layer 64 may further include a binder, a thickener, or the like. As the binder, for example, styrene-butadiene rubbers (SBR) or the like may be used. As the thickener, for example, carboxymethylcellulose (CMC) or the like may be used.

The negative electrode mixture layer 64 may be formed by dispersing a negative electrode active material and an optional material (a binder or the like) in a suitable solvent (for example, ion-exchange water), preparing a paste (or slurry) composition, then coating a suitable amount of the composition on the surface of the negative electrode current collector 62, and drying the composition.

As the separator 70, various fine porous sheets similar to those conventionally used in lithium ion secondary batteries may be used. Examples of such fine porous sheets include fine porous resin sheets made of resins such as polyethylene (PE) or polypropylene (PP). Such fine porous sheets may be a single layer structure or may be a multilayer structure including two or more layers (for example, a three-layer structure in which PP layers are laminated on both surfaces of a PE layer). A heat-resistant layer (HRL) may be provided on the surface of the separator 70.

The same type of non-aqueous electrolyte solutions as those used in conventional lithium ion secondary batteries may be used as the non-aqueous electrolyte, and the non-aqueous electrolyte may typically be one containing a supporting electrolyte in a non-aqueous solvent. As the non-aqueous solvent, aprotic solvents such as carbonates, esters, and ethers may be used. Among them, carbonates, for example, ethylene carbonate (EC), diethyl carbonate (DEC), dimethyl carbonate (DMC), ethyl methyl carbonate (EMC), or the like may suitably be adopted. Alternatively, fluorine-containing solvents such as fluorinated carbonates, including monofluoroethylene carbonate (MFEC), difluoroethylene carbonate (DFEC), monofluoromethyl difluoromethyl carbonate (F-DMC), trifluorodimethyl carbonate (TFDMC), or the like may preferably be used. These non-aqueous solvents may be used singly or may be used in combination of two or more thereof. As the supporting electrolyte, for example, $LiPF_6$, $LiBF_4$, $LiClO_4$, or the like may be suitably used. The concentration of the supporting electrolyte is not particularly limited and is preferably about not less than 0.7 mol/L and not more than 1.3 mol/L.

The non-aqueous electrolyte solution may contain other components than the above-mentioned non-aqueous solvent and the supporting electrolyte unless the effects of the technique disclosed herein are not significantly impaired. For example, the non-aqueous electrolyte may contain various additives such as a gas generator, a film-forming agent, a dispersing agent, and a thickening agent. Specific examples of such additives include film-forming agents such as lithium bis(oxalate)borate (LiBOB), vinylene carbonate (VC), vinylethylene carbonate (VEC), and fluoroethylene carbonate (FEC); overcharge additives consisting of a compound capable of generating gas at overcharging, represented by biphenyl (BP), cyclohexylbenzene (CHB) and the like; surfactants; dispersing agents; thickening agents; anti-freezing agents; and the like. The total concentration of these additives with respect to the entire non-aqueous electrolyte solution varies depending on the type of the additives but may normally be about 6 mass % or less (typically 0.5 mass % to 4 mass %).

The non-aqueous electrolyte secondary battery disclosed herein is provided with a current collector including a resin layer and metallic foils provided on both surfaces of the resin layer in at least one of the positive and negative electrodes. Hereinafter, an example wherein a current collector having such a constitution is used in the negative electrode current collector 62 is explained.

Figure 2:
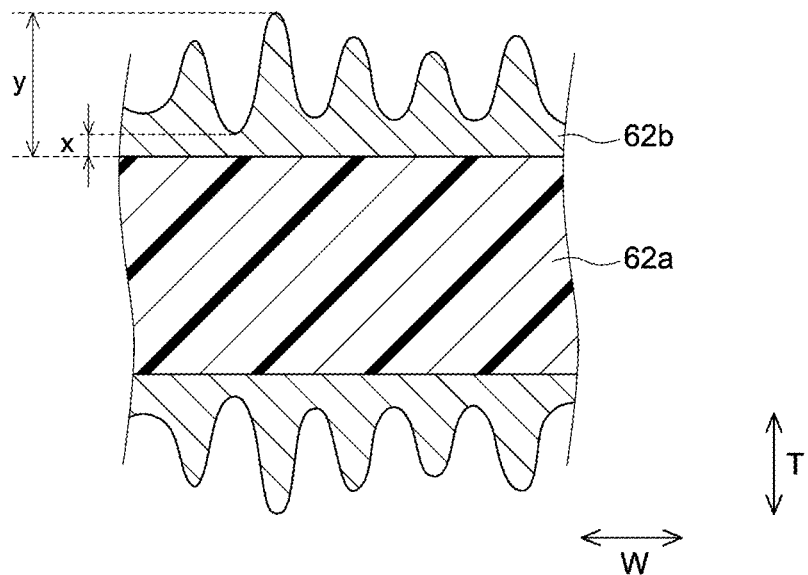
FIG. 2 is an enlarged sectional view schematically illustrating a structure of a negative electrode current collector of a lithium ion secondary battery according to one embodiment.

FIG. 2 is an enlarged sectional view for schematically illustrating the constitution of the negative electrode current collector 62. As illustrated in FIG. 2, the negative electrode current collector 62 includes a resin layer 62a and metallic foils 62b provided on both surfaces of the resin layer 62a.

Any resin that causes the volume increase when heated may be used as the resin layer 62a. A typical resin used in the resin layer 62a is constituted of a thermoplastic resin. A thermoplastic resin changes from a solid state to a liquid state when it reaches the melting point, increasing the volume. Due to the volume increase of the resin layer, pressure is applied to the metallic foil 62b, whereby the metallic foil 62b can be broken. Then, since the electrical resistance rapidly increases when the metallic foil 62b is broken, the current in the battery can be interrupted. Accordingly, a mechanism that interrupts the current in the battery functions when the temperature rises to the melting point of the resin layer 62a by abnormal heating and suppresses the temperature rise of the battery.

The thermoplastic resin constituting the resin layer 62a is not particularly limited, and a thermoplastic resin with a melting point of 265° C. or lower under 1 atm is preferably used. Examples of the thermoplastic resin having such properties include polyethylene terephthalate (PET), polyamide (PA), polyvinyl alcohol (PVA), polyethylene (PE), polypropylene (PP), polystyrene (PS), polyvinyl chloride (PVC), thermoplastic polyester, acrylonitrile-butadiene-styrene (ABS), acrylonitrile-styrene (AS), polymethyl methacrylate (PMMA), polyvinylidene chloride (PVDC), and the like. Furthermore, a thermoplastic resin with a melting point of 200° C. or lower under 1 atm is more preferably used, and for example, PVA, PE, PP, or the like may preferably be used. A resin layer 62a with a lower melting point enables the current in the battery to be interrupted at lower temperatures when abnormal heating occurs in the lithium ion secondary battery 100 due to internal short-circuits or the like. The thermoplastic resin may be used singly or may be used in combination of two or more thereof. The melting point of the resin layer may be measured by a common differential scanning calorimetry (DSC).

The resin layer 62a may include conductive particles. The inclusion of conductive particles in the resin layer 62a enables the electrical resistance to be reduced because of the increase of the conductivity of the negative electrode current collector 62.

As the conductive particles, for example, carbon powder, conductive metal powder, of the like may be used. As the carbon powder, various carbon blacks (for example, acetylene black, furnace black, ketjen black) and carbon powders such as graphite powder may be used. As the conductive metal powder, for example, copper powder, aluminum powder, nickel powder, or the like may be used. Among them, conductive metal powder constituted of the same metal as the metal constituting the metallic foil 62b may preferably be used. For example, when the metallic foil 62b is a copper foil, a copper powder may preferably be used as the conductive particles.

The size of the conductive particles is not particularly limited, and for example, a powdery conductive material having constituent particles with an average particle size determined by a laser diffraction scattering method of approximately within the range of 10 nm to 10 μm, for example, within the range of 20 nm to 5 μm. A single type of conductive particles may be used, or two or more types thereof may be used in combination.

The resin layer 62a may contain a filler. The shape of the filler is not particularly limited and for example, any of particulate, fibrous, plate-shaped, flaky fillers, and the like may be used.

The average particle diameter of the filler is not particularly limited, and the average particle diameter determined based on a laser diffraction scattering method is, for example, not less than 0.1 μm and not more than 10 μm and may be not less than 0.5 μm and not more than 5 μm.

Examples of the filler include inorganic oxides such as alumina ($Al_2O_3$), magnesia (MgO), silica ($SiO_2$), and titania ($TiO_2$); nitrides such as aluminum nitride and silicon nitride; metal hydroxides such as calcium hydroxide, magnesium hydroxide, and aluminum hydroxide; clay minerals such as mica, talc, boehmite, zeolite, appetite, and kaolin; glass fibers; and the like. These may be used singly or may be used in combination of two or more thereof.

The area where the resin layer 62a is provided is not particularly limited, and the resin layer 62a is preferably provided in the entire area excluding the negative electrode current collector exposed part. Providing the resin layer 62a in a wider area increases the number of starting points for breaking the metallic foil 62b at abnormal heating, and higher safety is achieved. In addition, not providing the resin layer 62a in the negative electrode current collector exposed part ensures the conduction between a plurality of negative electrode sheets with greater certainty when the negative electrode terminal joint 66 is formed by joining the negative electrode current collector exposed parts of the plurality of negative electrode sheets provided in the electrode body 20, and the plurality of negative electrode sheets and the negative electrode current collector terminal 44 can be electrically conducted.

The average thickness of the resin layer 62a may be approximately 0.1 μm or larger in view of the safety at abnormal heating and, for example, may be 10 μm or larger. Such an average thickness is preferable because the volume change that causes the pressure to break the metallic foil 62b at the melting of the resin layer 62a occurs. Although it is not particularly limited, the average thickness of the resin layer 62a is typically 80 μm or thinner, and for example, may be 40 μm or thinner. A greater thickness of the resin layer 62a is preferable in view of the safety at abnormal heating because the volume change of the resin layer 62a becomes greater. Meanwhile, a thickness greater than necessary is unpreferable for increasing the capacity of a battery because increasing the capacity of the battery becomes difficult due to the thickness of the current collector. The thickness of the resin layer 62a may be measured, for example, by scanning electron microscope (SEM) observation or the like.

A metallic foil conventionally used for negative electrode current collectors in lithium ion secondary batteries may be used as the metallic foils 62b, and for example, a copper foil or the like may be used. The metallic foils 62b are provided on both surfaces of the resin layer 62a, and the negative electrode mixture layer 64 is formed on a surface, opposite to the surface facing the resin layer 62a, of the metallic foil 62b.

As illustrated in FIG. 2, a surface-roughened part, which is subjected to the surface roughening processing, is provided on a surface, on which the negative electrode mixture layer is formed, of the metallic foil 62b, and projections and recesses exist in the surface-roughened part. The surfaces on the resin layer 62a side of the metallic foils 62b may be smooth or roughened. In FIG. 2, smooth surfaces are illustrated.

The thickness of metallic foil 62b can be measured based on a sectional SEM image of the metallic foil 62b in the stacked direction of the resin layer 62a and the metallic foil 62b (T direction in FIG. 2), and the thickness x (μm) of the thinner part and the thickness y (μm) of the thickest part of the metallic foil 62b can be measured. By obtaining a plurality (for example, four or more) of the sectional SEM images at a predetermined magnification (typically, ×4000), the average X (μm) of the x and the average Y (μm) of they can be determined. As illustrated in FIG. 2, the thickness x at the thinnest part is typically positioned in the recessed part, and the thickness y at the thickest part is typically positioned in the projection. The average X in the present description refers to an average of the thicknesses x (μm) at the thinnest parts of a metallic foil in each field of view in sectional SEM images (magnification: ×4000) obtained in four different fields of view in the stacked direction of a resin layer and a metallic foil of a current collector (negative electrode current collector 62 in this case) having a constitution disclosed herein. Similarly, the average Y in the present description refers to an average of the thicknesses y (μm) at the thickest parts of a metallic foil in each field of view in sectional SEM images (magnification: ×4000) obtained in four different fields of view. In each field of view, when the thickness y at the thickest part of the metallic foil does not fit within the field of view, the magnification can be appropriately adjusted for measuring the thickness y.

The average X of the thickness x at the thinnest part of the metallic foil 62b based on the sectional SEM image mentioned above preferably satisfies 0.1 µm<X<4 µm, and for example, may be 0.11 µm≤X≤3.9 µm. The part where the thickness x at the thinnest part is located is an easily breakable part by the volume change associated with the melting of the resin layer 62a. Thus, when the X is too large, the part is not easily broken by the volume change of the resin layer 62a, and therefore, it is preferable to satisfy the range.

The average Y of the thickness y at the thickest part of the metallic foil 62b based on the above sectional SEM image satisfies 0.1 µm<X<4 µm (or 0.11 µm≤X≤3.9 µm) as mentioned above, and preferably satisfies 1.2X≤Y (that is, 1.2≤Y/X). Since the negative electrode mixture layer does not easily peel off the metallic foil 62b according to the above range, the deterioration of cycle characteristics can be suppressed. Due to the difference in thickness represented by the above range, the electron density may become uneven. Therefore, a desolvation reaction tends to proceed in the negative electrode mixture layer formed on the metallic foil 62b. According to this constitution, the electrical resistance can be decreased.

Although it is not particularly limited, the Y may generally be Y≤85X (Y/X≤85), and for example, may be Y≤1.7X (Y/X≤1.7) for increasing the capacity of a battery.

In the projections and recesses in the surface-roughened part of the metallic foil 62b, the distance between the adjacent projections is preferably 1 µm of smaller. According to the above range, repetitions of thin parts and thick parts increase on the metallic foil, and therefore, the above electrical resistance-reducing effect can be achieved at a higher level. The "distance between the projections" refers to a distance between the highest parts of adjacent projections in a sectional SEM image.

The area where the surface-roughened part is provided on the surface of the negative electrode mixture layer of the metallic foil 62b is not particularly limited, and the surface-roughened part is preferably provided in the entire area where the negative electrode mixture layer is formed. Due to this constitution, the increasing effect of the peeling strength of the negative electrode mixture layer and the reducing effect of the electrical resistance are exhibited at a higher level. In addition, since thin parts that can be starting points of metallic foil breaking at abnormal heating can be widely arranged, a non-aqueous electrolyte secondary battery with higher safety can be realized.

The surface-roughened part may be formed by a known surface-roughening method, and for example, laser radiation, etching, sputtering, ion plating, pulsed laser deposition (PLD), and the like may be used. Among them, the surface-roughened part is preferably formed by etching using chemical solutions. Such etching can form a more uniform surface-roughened part, decrease the distance between projections in the surface-roughened part, and make the distance between the projections be, for example, 1 µm or smaller.

Hereinafter, an example of a suitable method for producing the negative electrode current collector 62 is explained. First, a resin sheet made of a resin constituting the resin layer 62a is prepared. Next, a surface-roughened metallic foil used for the metallic foil 62b is prepared and superimposed on the resin sheet. At this time, the position at which the resin layer is provided can be adjusted by adjusting the position of the metallic foil, and for example, a structure in which the resin layer 62a is not formed in the negative electrode terminal joint 66 can be made. After superimposing the metallic foil on the resin sheet, the obtained laminate is hot-pressed. The surface of the resin sheet melts by the hot pressing, and the metallic foil and the resin sheet are thereby welded to each other. The hot pressing can be carried out, for example, at 100° C. to 250° C. for 1 to 30 minutes.

As described above, the negative electrode current collector 62 having a constitution provided with metallic foils 62b on both surfaces of the resin layer 62a and having a smooth interface between the metallic foil 62b and the resin layer 62a is illustrated in FIG. 2 and explained. However, the constitution of the negative electrode current collector 62 disclosed herein is not particularly limited thereto. Hereinafter, a modified example is illustrated in FIG. 3 and explained.

MODIFIED EXAMPLE

Figure 3:
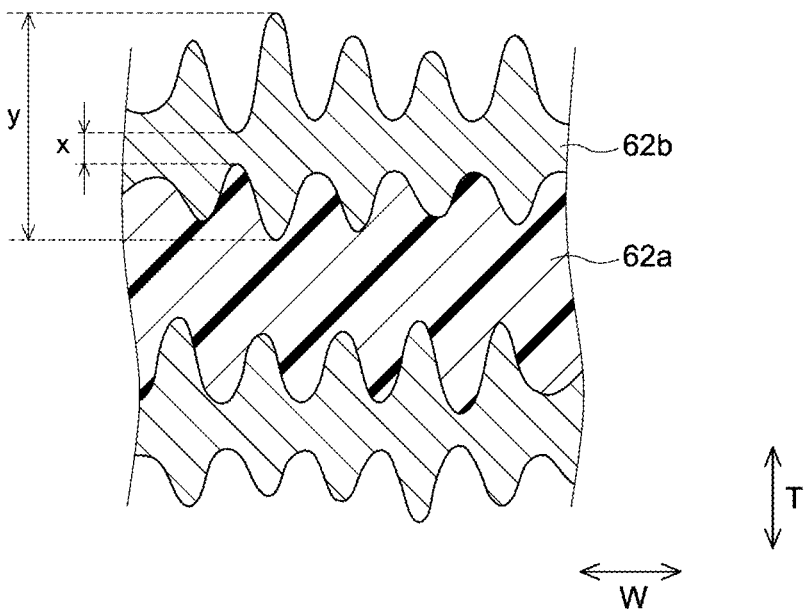
FIG. 3 is an enlarged sectional view schematically illustrating a structure of a modified example of a negative electrode current collector of a lithium ion secondary battery according to one embodiment.

A modified example of the negative electrode current collector 62 illustrated in FIG. 3 has projections and recesses at the interface between the metallic foil 62b and the resin layer 62a. That is, both surfaces of the metallic foil 62b are roughened. According to this constitution, as illustrated in FIG. 3, the thickness x (µm) at the thinnest part of the metallic foil 62b and the thickness y (µm) at the thickest part are measured based on the thickness at a part where the metallic foil 62b exists in the stacked direction (T direction in FIG. 3). That is, the thickest part of the metallic foil 62b may be thinner than the length from the top of a projection having the greatest thickness on the surface on which the negative electrode mixture layer of the metallic foil 62b is formed to the top of a projection having the greatest thickness on the surface on the resin layer 62a side of the metallic foil 62b.

As described above, an example of a constitution of a current collector and a production method disclosed herein is explained using the negative electrode current collector 62 as an example. However, a similar constitution may be acceptable in the case where a current collector disclosed herein is used in the positive electrode current collector 52. For example, when a metallic foil constituting the metallic foil is changed to an aluminum foil, other constitutions may be the same. Furthermore, the constitution including metallic foils on both surfaces of a resin layer is illustrated and explained. However, a constitution on which a metallic foil is provided on one surface of a resin layer is also acceptable.

The lithium ion secondary battery 100 can be used in various types of applications. For example, the lithium ion secondary battery 100 may suitably be used as a high output power source (driving power supply) for motors mounted on vehicles. The type of such vehicles is not particularly limited, and typically automobiles, for example, plug-in hybrid electric vehicles (PHEVs), hybrid electric vehicles (HEVs), battery electric vehicles (BEVs), and the like may be mentioned. The lithium ion secondary battery 100 may be used in the form of an assembled battery including a plurality of batteries electrically connected to one another.

As described above, a laminated-type non-aqueous electrolyte secondary battery provided with a laminated electrode body is explained in detail as an example, but this is merely an example and does not limit the scope of claims. The techniques recited in claims encompass variations and modifications of the embodiments mentioned above by way of examples. For example, a wound electrode body obtained by winding a positive electrode sheet and a negative electrode sheet via a separator sheet may be provided in place of the laminated electrode body. Alternatively, a battery case constituted by a metallic material such as aluminum may be used in place of the exterior body 10. Alternatively, allsolid-state batteries using solid electrolytes as an electrolyte and polymer batteries using polymer electrolytes are also adoptable.

Hereinafter, examples relating to the techniques disclosed herein will be described, but it is not intended to limit the techniques disclosed herein to those shown in such examples.

Experiment 1

Preparation of Negative Electrode Current Collector

Example 1

Commercially available copper foils for current collectors, where both surfaces thereof were pre-roughened, were used.

Examples 2 to 10

Commercially available copper foils for current collectors with various thicknesses, where both surfaces thereof were pre-roughened, were prepared. Furthermore, copper foils having a surface on which a mixture layer was to be formed was unetched or etched using a chemical solution were prepared. Then, the copper foils were laminated on both surfaces of a 10 μm-thick resin sheet made of polyethylene terephthalate (PET), and the resin sheet was welded on the copper foils by hot-pressing at 100° C. to 250° C. for 1 to 30 minutes. In this way, a negative electrode current collector including copper foils having a roughened surface and provided on both surfaces of a resin layer was produced. Note that the etching conditions were changed in each example for changing the degree of surface roughening.

Production of Lithium Ion Secondary Battery for Evaluation $LiNi_{1/3}Co_{1/3}Mn_{1/3}O_2$ (NCM) powder as a positive electrode active material, acetylene black (AB) as a conductive assistant, polyvinylidene fluoride (PVDF) as a binder, and polyvinyl alcohol as a dispersing agent were prepared such that the mass ratio of the positive electrode active material, the conductive assistant, the binder, and the dispersing agent would be 90:8:1.8:0.2 in this order. Then, they were mixed with a dispersing medium N-methyl-2-pyrrolidone (NMP) such that the solids content would be 56 mass %. In this way, a paste for forming a positive electrode mixture layer was prepared.

Next, the paste for forming a positive electrode mixture layer was coated on both surfaces of a belt-shaped aluminum foil using a die coater and dried. Then, the aluminum foil provided with a dried paste for forming a positive electrode mixture layer was pressed, thereby producing a positive electrode sheet.

A mixture containing silicon oxide powder and graphite in a mass ratio of 80:20 was prepared as a negative electrode active material. Styrene-butadiene rubber (SBR) as a binder and carboxymethyl cellulose (CMC) as a thickening agent were prepared separately. Then, the negative electrode active material, SBR, and CMC were weighed such that the mass ratio would be 90:5:5 in this order, and mixed with ion-exchange water, a dispersing medium, such that the solids fraction would be 66 mass %. In this way, a paste for forming a negative electrode mixture layer was prepared.

Next, the paste for forming a negative electrode mixture layer was coated, using a die coater, on a surface-roughened copper foil of the current collector of each example prepared as above. Note that the paste for forming a negative electrode mixture layer was coated on one surface of a copper foil in example 1, and the paste was coated on each surface of copper foils laminated on both surfaces of a resin layer in examples 2 to 10. After drying, a negative current collector provided with the dried paste for forming a negative electrode mixture layer was pressed, thereby producing a negative electrode sheet.

Separately, a porous olefin sheet with a three-layer PP/PE/PP structure was prepared as a separator sheet.

The positive electrode sheet and the negative electrode sheet produced as above were laminated via the separator sheet such that the positive and negative electrode sheets face each other, thereby producing a laminated electrode body. A current collector terminal was attached to the laminated electrode body and put in an aluminum laminated bag. Then, the laminated electrode body was impregnated with a non-aqueous electrolyte solution, an opening of the aluminum laminated bag was sealed and tightly closed, thereby producing a lithium ion secondary battery for evaluation. As a non-aqueous electrolyte solution, a solution obtained by mixing ethylene carbonate (EC) and ethyl methyl carbonate (EMC) in a volume ratio of 1:3, then adding 2 mass % of vinylene carbonate (VC) to produce a mixed solvent, and $LiPF_6$, a supporting electrolyte, was dissolved in the mixed solvent in a concentration of 1.0 mol/L.

Evaluation of Surface-Roughened Copper Foil of Negative Electrode Sheet

A section in the stacked direction of the copper foil and the mixture layer of each example produced as above was observed at a magnification of ×4000 using an SEM, and sectional SEM images in four different fields of view were obtained. The minimum thickness x and the maximum thickness y of a copper foil were measured in each obtained sectional SEM image. Note that, since copper foils were laminated on a resin layer in examples 2 to 10, the minimum thickness and the maximum of each copper foil were measured per field of view. Finally, the average X (μm) of minimum thicknesses and the average Y (μm) of maximum thicknesses in the copper foil of each example were determined using the minimum thicknesses and the maximum thicknesses obtained in each of sectional SEM images of four different fields of view. The values are indicated in Table 1 as the "average minimum thickness X (μm)" and the "average maximum thickness Y (μm)", respectively.

Activation Treatment and Initial Capacity Measurement

Each lithium ion secondary battery for evaluation produced as above was put in a condition at 25° C. An initial charging was set in the form of a constant current/constant voltage system, and each lithium ion secondary battery for evaluation was charged with constant current to 4.2 V at a current value of 1/3C and then charged with constant voltage until the current value reached 1/50 C to charge the battery fully. After that, each lithium ion secondary battery for evaluation was discharged with a constant current to 3.0 V at a current value of 1/3 C. The discharge capacity at this time was measured, and an initial capacity was determined. Note that "1C" used herein refers to a magnitude of current that can charge a battery from 0% to 100% SOC (state of charge) in one hour.

Measurement of Standardized Battery Resistance

Each activated lithium ion secondary battery for evaluation was adjusted to an open circuit voltage of 3.70 V and put under a temperature condition at −5° C. The battery was discharged at a current value of 3C for eight seconds, and the voltage variation ΔV at this time was determined. In addition, the 20C-current value was determined. Then, a battery resistance was calculated using the 20C-current value and ΔV. A resistance ratio of a lithium ion secondary battery for evaluation of each example was determined on the assumption that the resistance of the lithium ion secondary battery for evaluation of example 1 was set to 1.00. Table 1 shows the results.

Measurement of Capacity Retention Rate

Each activated lithium ion secondary battery for evaluation was adjusted to an open circuit voltage of 3.3 V and put under a condition at 60° C. Discharging and charging were carried out in a constant current system, and a battery was charged to 4.2 V at a current value of 1C and thereafter discharged to 3.3 V at a current value of 1 C. This charging/discharging was set as one cycle, and 200 cycles were repeated. After that, the discharging capacity after the 200 cycles was measured similarly to the initial capacity. Then, the capacity retention rate (%) was determined by calculating the value obtained from a formula: (discharging capacity after 200 cycles/initial capacity)×100. Table 1 shows the results.

Safety Evaluation by Safety Test

Each activated lithium ion secondary battery for evaluation was charged with constant current to 4.2 V at a current value of 1/3C and then charged with constant voltage until the current value reached 1/10C to charge the battery fully. After that, each fully-charged lithium ion secondary battery for evaluation was put in a condition at 25° C. Next, an iron nail with a diameter of 3 mm was penetrated around the center of each lithium ion secondary battery for evaluation at a speed of 10 mm/sec. The outer surface temperature of each lithium ion secondary battery for evaluation at this time was measure using a thermocouple, and the maximum temperature was measured. A case where the maximum temperature at this time was lower than 150° C. was evaluated was "++", a case where the maximum temperature was lower than 200° C. was evaluated as "+", and a case where the maximum temperature was 200° C. or higher was evaluated as "−". Table 1 shows the results.

As indicated in Table 1, the maximum temperatures of the outer surface of the batteries became 200° C. or higher in the safety test for examples 1 to 5. On the contrary, the maximum temperatures of the outer surface of the batteries became lower than 200° C. in the safety test for examples 6 to 10. These results confirmed, in examples 6 to 10, that the copper foil was broken before the temperature of the outer surface of the battery before the temperature rose to 200° C., and the current due to the internal short-circuit could be interrupted. In addition, examples 6 to 10 showed lower battery resistances (internal resistance of a battery) and higher capacity retention rates than examples 1 to 5. From these results, it is found that using a negative electrode current collector including surface-roughened copper foils on both surfaces of a resin layer and satisfying an average minimum thickness X of $0.1 \ \mu m < X < 4 \ \mu m$ and also satisfying $1.2 \leq Y/X$ enables to reduce the electrical resistance, improve the capacity retention rate, and furthermore, achieve high safety.

Experiment 2

Preparation of Negative Electrode Current Collector

Example 11

A negative electrode current collector was produced in the same manner as example 8 except that, in the constitution of the negative electrode current collector in example 8, copper particles were incorporated as conductive particles in the resin layer of the negative electrode current collector.

Example 12

A negative electrode current collector was produced in the same manner as example 8 except that, in the constitution of the negative electrode current collector in example 8, alumina ($Al_2O_3$) particles were incorporated as a filler in the resin layer of the negative electrode current collector.

Lithium ion secondary batteries for evaluation were produced using the negative electrode current collectors of examples 11 and 12 in the same manner as experiment 1. Then, the measurements of the thickness of a metallic foil based on a sectional SEM image, the standardized battery resistance, and the capacity retention rate, and the safety test were carried out in the same manner as experiment 1. Table 2 shows the results of examples 8, 11, and 12. Note that a value of the standardized battery resistance indicates a relative value in the assumption that the value in example 1 was set to 1.00 (Regarding the results of example 1, see Table 1).

TABLE 1

| | Metallic foil | Resin | Average minimum thickness X (μm) | Average maximum thickness Y (μm) | Y/X | Standardized battery resistance | Capacity retention rate (%) | Safety test |
|---|---|---|---|---|---|---|---|---|
| Example 1 | Cu | None | 3 | 5 | 1.7 | 1.00 | 45.0 | − |
| Example 2 | Cu | PET | 0.1 | 0.12 | 1.2 | 1.11 | 44.9 | − |
| Example 3 | Cu | PET | 0.1 | 0.85 | 8.5 | 1.05 | 45.0 | − |
| Example 4 | Cu | PET | 4 | 4.8 | 1.2 | 0.95 | 49.3 | − |
| Example 5 | Cu | PET | 4 | 340 | 85 | 0.94 | 50.0 | − |
| Example 6 | Cu | PET | 0.11 | 0.132 | 1.2 | 0.83 | 65.0 | + |
| Example 7 | Cu | PET | 0.11 | 9.35 | 85 | 0.81 | 65.0 | + |
| Example 8 | Cu | PET | 3 | 5 | 1.7 | 0.85 | 65.2 | + |
| Example 9 | Cu | PET | 3.9 | 4.68 | 1.2 | 0.84 | 65.3 | + |
| Example 10 | Cu | PET | 3.9 | 331.5 | 85 | 0.85 | 66.2 | + |

TABLE 2

|  | Metallic foil | Resin | Average minimum thickness X (μm) | Average maximum thickness Y (μm) | Conductive particles | Filler | Standardized battery resistance | Capacity retention rate (%) | Safety test |
|---|---|---|---|---|---|---|---|---|---|
| Example 8 | Cu | PET | 3 | 5 | None | None | 0.85 | 65.2 | + |
| Example 11 | Cu | PET | 3 | 5 | Cu | None | 0.79 | 66.6 | + |
| Example 12 | Cu | PET | 3 | 5 | None | $Al_2O_3$ | 0.80 | 67.2 | + |

As indicated in Table 2, the standardized battery resistance was lower and the capacity retention rate was higher in examples 11 and 12 than in example 8. Accordingly, it is found that a resin layer including conductive particles of a filler achieves excellent electrical resistance-reducing effect and capacity retention rate.

Experiment 3

Preparation of Negative Electrode Current Collector

Example 13

A negative electrode current collector was produced in the same manner as example 8 except that the resin layer of the negative electrode current collector in example 8 was changed from PET (melting point at 1 atm: 255° C.) to polyamide (PA). The polyamide used in this example had a melting point at 1 atm of 265° C.

Example 14

A negative electrode current collector was produced in the same manner as example 8 except that the resin layer of the negative electrode current collector in example 8 was changed from PET to polyvinyl alcohol (PVA). The PVA used in this example had a melting point at 1 atm of 200° C.

Example 15

A negative electrode current collector was produced in the same manner as example 8 except that the resin layer of the negative electrode current collector in example 8 was changed from PET to polyethylene (PE). The PE used in this example had a melting point at 1 atm of 130° C.

In examples 13 to 15, the thickness of the resin layer was set to 10 μm.

Lithium ion secondary batteries for evaluation were produced using the negative electrode current collectors of examples 13 to 15 in the same manner as experiment 1. Then, the measurements of the thickness of a metallic foil based on a sectional SEM image, the standardized battery resistance, and the capacity retention rate, and the safety test were carried out in the same manner as experiment 1. Table 3 shows the results of examples 8 and 13 to 15. Note that the value of the standardized battery resistance indicates a relative value in the assumption that the value in example 1 was set to 1.00 (Regarding the results of example 1, see Table 1).

TABLE 3

|  | Metallic foil | Resin | Melting point of resin (° C.) | Average minimum thickness X (μm) | Average maximum thickness Y (μm) | Standardized battery resistance | Capacity retention rate (%) | Safety test |
|---|---|---|---|---|---|---|---|---|
| Example 8 | Cu | PET | 255 | 3 | 5 | 0.85 | 65.2 | + |
| Example 13 | Cu | PA | 265 | 3 | 5 | 0.87 | 64.3 | + |
| Example 14 | Cu | PVA | 200 | 3 | 5 | 0.86 | 66.0 | ++ |
| Example 15 | Cu | PET | 130 | 3 | 5 | 0.84 | 65.5 | ++ |

As indicated as examples 8 and 13 to 15 in Table 3, the maximum temperatures of the outer surface of the batteries became lower than 200° C. in the safety test by including resin layers constituted of thermoplastic resins with melting points at 1 atm of 265° C. or lower. Accordingly, it is found that the batteries were highly safe. Among them, the maximum temperatures of the outer surface of the batteries became lower than 150° C. in the safety test for examples 14 and 15, especially high safety was shown. Accordingly, it is found that further higher safety can be achieved by including resin layers constituted of thermoplastic resins with melting points at 1 atm of 200° C. or lower.

Experiment 4

Preparation of Negative Electrode Current Collector

Example 16

The copper foil used in example 8, in which both surfaces of the copper foil had been pre-roughened, was changed to a copper foil in which one surface had not been roughened. Then, the roughened surface of the copper foil was etched using a chemical solution, thereby adjusting the average X (μm) of the minimum thicknesses and the average Y (μm) of the maximum thicknesses of the copper foil to be the same levels as example 8. Next, an unroughened surface of the copper foil was laminated so as to be in contact with a 10 μm-thick resin sheet made of PET, and the resin sheet was welded on the copper foil by hot-pressing at 100° C. to 250° C. for 1 to 30 minutes. This process was carried out on both surfaces of the resin sheet. In this way, the negative electrode current collector of example 16 was produced.

After that, a lithium ion secondary battery for evaluation was produced using the negative electrode current collector of example 16 in the same manner as experiment 1. Then, the measurements of the thickness of a metallic foil based on a sectional SEM image, the standardized battery resistance, and the capacity retention rate, and the safety test were carried out in the same manner as experiment 1. Table 4 shows the results of examples 8 and 16. Note that the value of the standardized battery resistance indicates a relative value in the assumption that the value in example 1 was set to 1.00 (Regarding the results of example 1, see Table 1).

TABLE 4

| | Metallic foil | Roughening of interface between metallic foil and resin | Resin | Average minimum thickness X (μm) | Average maximum thickness Y (μm) | Standardized battery resistance | Capacity retention rate (%) | Safety test |
|---|---|---|---|---|---|---|---|---|
| Example 8 | Cu | Rough | PET | 3 | 5 | 0.85 | 65.2 | + |
| Example 16 | Cu | Smooth | PET | 3 | 5 | 0.84 | 65.1 | + |

As indicated in Table 4, it is found that the surface on the resin layer side of the metallic foil (copper foil in this example) showed excellent electrical resistance-reducing effect and capacity retention rate regardless of whether the surface was roughened or not, and a lithium ion secondary battery with high safety could be realized.

Experiment 5

Preparation of Positive Electrode Current Collector

Example 17

Commercially available aluminum foils for current collectors, where both surfaces thereof were roughened, were used. This aluminum foil was laminated on both surfaces of a 10 μm-thick resin sheet made of PET, and the resin sheet was welded by hot-pressing. In this way, a positive electrode current collector including an aluminum foil having a roughened surface on both surfaces of a resin layer was produced. Lithium ion secondary batteries for evaluation were produced using the positive electrode current collector in the same manner as experiment 1. Then, the measurements of the thickness of a metallic foil based on a sectional SEM image, the standardized battery resistance, the capacity retention rate, and the safety test were carried out in the same manner as experiment 1. Note that the measurement of the thickness of a metallic foil based on a sectional SEM image was replaced with a measurement of the thickness of a metallic foil (aluminum foil) in the positive electrode current collector. Note that the negative electrode used in this example was the same as that used in example 1. Table 5 shows the results of examples 1 and 17.

TABLE 5

| | Metallic foil | Resin | Average minimum thickness X (μm) | Average maximum thickness Y (μm) | Standardized battery resistance | Capacity retention rate (%) | Safety test |
|---|---|---|---|---|---|---|---|
| Example 1 | Cu | None | 3 | 5 | 1.00 | 45.0 | − |
| Example 17 | Al | PET | 3 | 5 | 0.87 | 60.2 | + |

As indicated in Table 5, the result of the safety test was also good in example 17, in which the positive electrode includes a construction disclosed herein. In addition, excellent electrical resistance-reducing effect and excellent capacity retention rate were shown. Accordingly, it is found that electrodes provided with current collectors having a constitution disclosed herein can achieve high safety, excellent electrical resistance-reducing effect, and capacity retention rate both in a positive electrode and a negative electrode.

As described above, specific embodiments of the techniques disclosed herein are explained in detail, but these are mere examples and do not limit the scope of claims. The techniques recited in claims encompass variations and modifications of specific embodiments mentioned by way of examples.

What is claimed is:

1. A non-aqueous electrolyte secondary battery, comprising:
 a positive electrode, a negative electrode, and a non-aqueous electrolyte,
 the positive and negative electrodes each including a current collector and a mixture layer formed on a surface of the current collector;
 the current collector including a resin layer and metallic foils provided on both surfaces of the resin layer in at least one of the positive and negative electrodes; and
 a surface of the metallic foils on which the mixture layer is formed being roughened;
 wherein an average X (μm) of thicknesses x of the thinnest parts and an average Y (μm) of thicknesses y of the thickest parts of the metallic foils determined based on a plurality of obtained sectional SEM images in a stacked direction of the resin layer and the metallic foils satisfy the following relationship:

$0.1 < \mu m < X < 4$ μm, and $1.2 \leq Y/X$, wherein the resin layer includes a resin having a melting point of 265° C. or lower under 1 atm, the resin being polyethylene terephthalate (PET), and
 wherein the metallic foils are copper foils.

2. The non-aqueous electrolyte secondary battery according to claim 1, wherein the roughened surface is provided over an entire area of the metallic foil in which the mixture layer is formed.

3. The non-aqueous electrolyte secondary battery according to claim 1, wherein the PET has a melting point of 200° C. or lower under 1 atm.

4. The non-aqueous electrolyte secondary battery according to claim 1, wherein the current collector provided in the negative electrode includes the resin layer and the metallic foils.

5. The non-aqueous electrolyte secondary battery according to claim 1, wherein the resin layer comprises a conductive particle.

6. The non-aqueous electrolyte secondary battery according to claim 5, wherein the conductive particle is constituted of a same metal as the metallic foil in contact with the resin layer.

7. The non-aqueous electrolyte secondary battery according to claim 1, wherein the resin layer comprises a filler.

* * * * *